United States Patent [19]
Lipscomb, Jr. et al.

[11] 3,979,137

[45] Sept. 7, 1976

[54] MOTORCYCLE TRAILER

[76] Inventors: Orange Ray Lipscomb, Jr., 4308 Ward Road; Edward Bernard Sales, 4501 Denfield St., both of Durham, N.C. 27704

[22] Filed: July 17, 1975

[21] Appl. No.: 596,756

[52] U.S. Cl. .............................................. 280/402
[51] Int. Cl.² .......................................... B60P 3/06
[58] Field of Search ............... 280/402, 476 R, 292; 180/14 C; 214/450, 86 A, 332

[56] References Cited
UNITED STATES PATENTS

| | | | |
|---|---|---|---|
| 718,322 | 1/1903 | Davis | 280/292 |
| 2,773,696 | 12/1956 | George | 280/402 X |
| 3,417,890 | 12/1968 | Yamazaki | 280/402 X |
| 3,428,332 | 2/1969 | McCance | 280/402 |
| 3,430,983 | 3/1969 | Jones | 280/292 X |
| 3,547,290 | 12/1970 | Fratzke | 214/86 A X |

*Primary Examiner*—Robert R. Song
*Assistant Examiner*—R. Schrecengost
*Attorney, Agent, or Firm*—B. B. Olive

[57] ABSTRACT

A two-wheel motorcycle trailer has a curved cradle for receiving the rear wheel of a motorcycle. The cradle is secured to the trailer frame and made horizontally pivotal by a swivel assembly. The frame serves to pivotally support the cradle and to connect the trailer to the towing vehicle by means of a draw bar assembly. The trailer can be disassembled into three parts for transfer or storage in the trunk of a standard size automobile. In alternative embodiment, a trailer having three cradles with a common pivot point is provided to hold up to three motorcycles.

10 Claims, 10 Drawing Figures

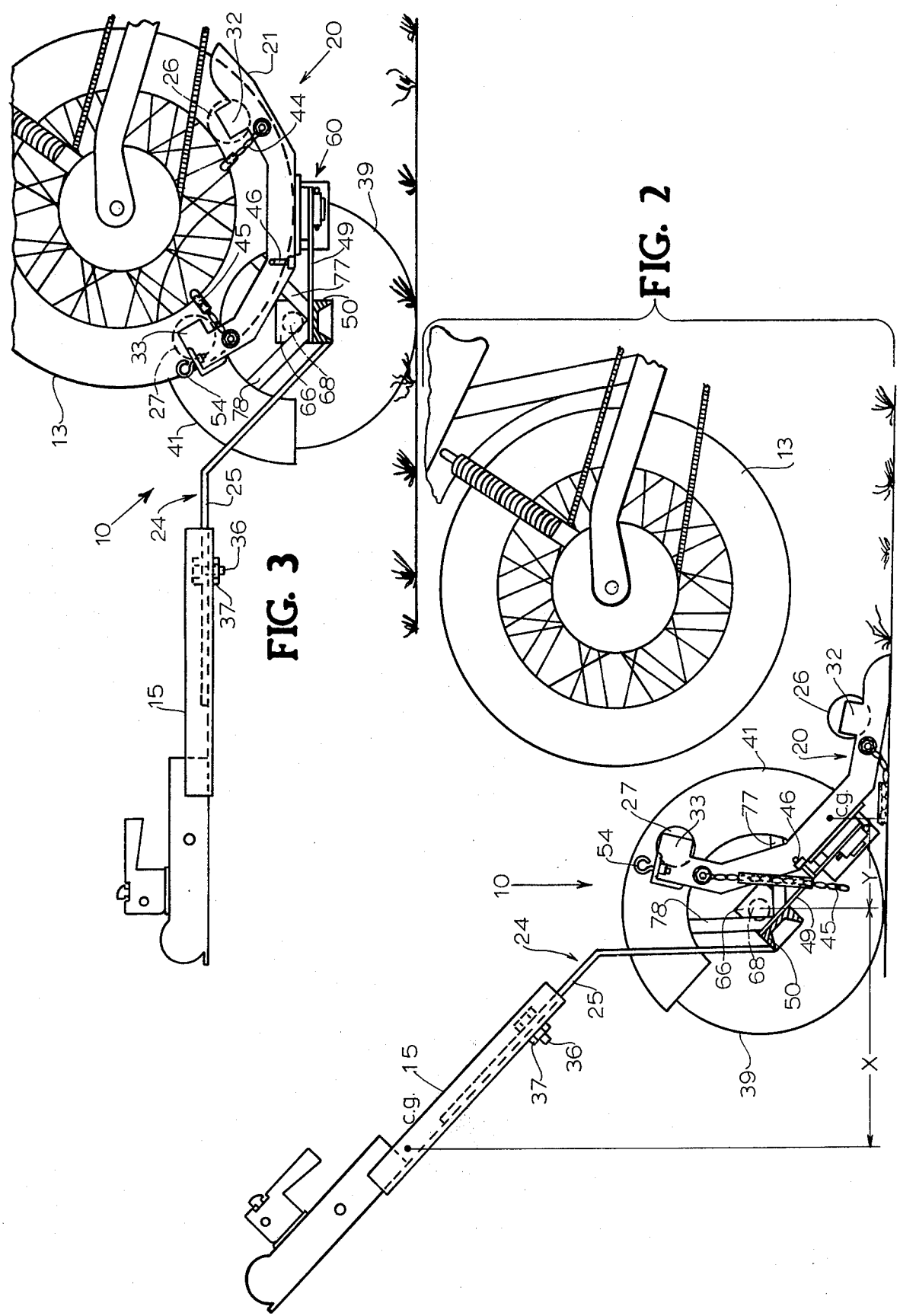

MOTORCYCLE TRAILER

BACKGROUND OF THE INVENTION

1. Field of the Invention

The invention relates to towing devices for motorcycles. More specifically, the invention relates to a two-wheel trailer having means to support one wheel of the motorcycle while the other wheel follows on the road surface.

2. Description of the Prior Art

The use of motorcycles for recreation purposes has greatly increased in recent years. Since recreation riding areas are often far removed from the cyclist's home, it is desirable to have a trailer for conveying the motorcycle from one location to another. To be practical, such a trailer must be relatively inexpensive, easily stored in the trunk of a car, stable in operation, and exert minimal stress on the motorcycle. The prior art practice includes standard two-wheel trailers which carry the entire motorcycle on a flat bed. Such standard trailers present problems in tying the motorcycle down during towing and in storing the trailer when not in use. U.S. Pat. No. 2,988,382 introduced a novel trailer which carries both wheels of the motorcycle off the ground in a channel which is supported by one wheel. However, the loading and unloading of this patented trailer is time consuming and requires the use of a bumper jack. Similar trailers called "rails" carry the motorcycle approximately 18 inches off the ground in a channel supported by two wheels. The rails have improved on the loading and unloading problem, but they generally require more than one person to load or unload. The rails also require excessive storage space and cannot fit into the trunk of a standard size car. Furthermore, because the rail elevates the entire motorcycle, the springs on the motorcycle cannot be used to absorb road shock and separate springs must be provided as part of the rail itself.

The towing devices of U.S. Pat. Nos. 2,789,832; 3,428,332 and 3,822,898 are designed to suspend the front wheel of the motorcycle from the bumper of a towing vehicle while the rear wheel follows on the road surface. Such devices are compact and relatively inexpensive, but they can result in excessive wear on the bearings of the motorcycle's rear wheel and require the removal of the motorcycle chain before towing. Furthermore, a large portion of the weight of the motorcycle is exerted down on the bumper of the vehicle. Since some motorcycles approach 1000 lbs., this added weight can make it impossible to use the suspension devices on small cars and can cause road handling problems when used on standard-size cars. This suspension technique is extremely impractical for towing multiple motorcycles.

A study of the prior art reveals that there is an acute need for a motorcycle trailer which will support the weight of the motorcycle or motorcyles to be towed; which is relatively inexpensive to manufacture; which exerts little stress on the motorcycle during towing; which can be stored in the trunk of a car; which can utilize the springs of the motorcycle to absorb road shock; and which, in an alternative embodiment, can support up to three motorcycles. Also, there is a need for a means to transport motorcycles with extended forks, i.e., "choppers", which are too long for standard rails.

SUMMARY OF THE INVENTION

The apparatus of the invention provides a two-wheel motorcycle dolly or trailer for the towing of a motorcycle with the rear wheel secured in a curved cradle and with the front wheel following on the road surface. The cradle is secured to the trailer frame for horizontal pivotal movement. One person can load the trailer by placing the cradle under the rear wheel of the motorcycle while elevated by the center stand, clamping the rear wheel to the cradle, and connecting the draw bar to the towing vehicle. By disassembling the trailer into three parts, it can be readily stored in the trunk of a standard size automobile. In alternative embodiment, a trailer having three cradles can hold up to three motorcycles and is adapted to pivot about a single pivot point.

DESCRIPTION OF THE DRAWINGS

FIG. 2 is a side view of the trailer with the left wheel of the trailer cut away to show the cradle in a position to receive the rear wheel of a motorcycle.

FIG. 3 is a side view similar to FIG. 2 with the motorcycle rear wheel secured to the cradle and with the draw bar brought to a horizontal position for securement to the towing vehicle.

DESCRIPTION OF THE PREFERRED EMBODIMENT

Figure 1:
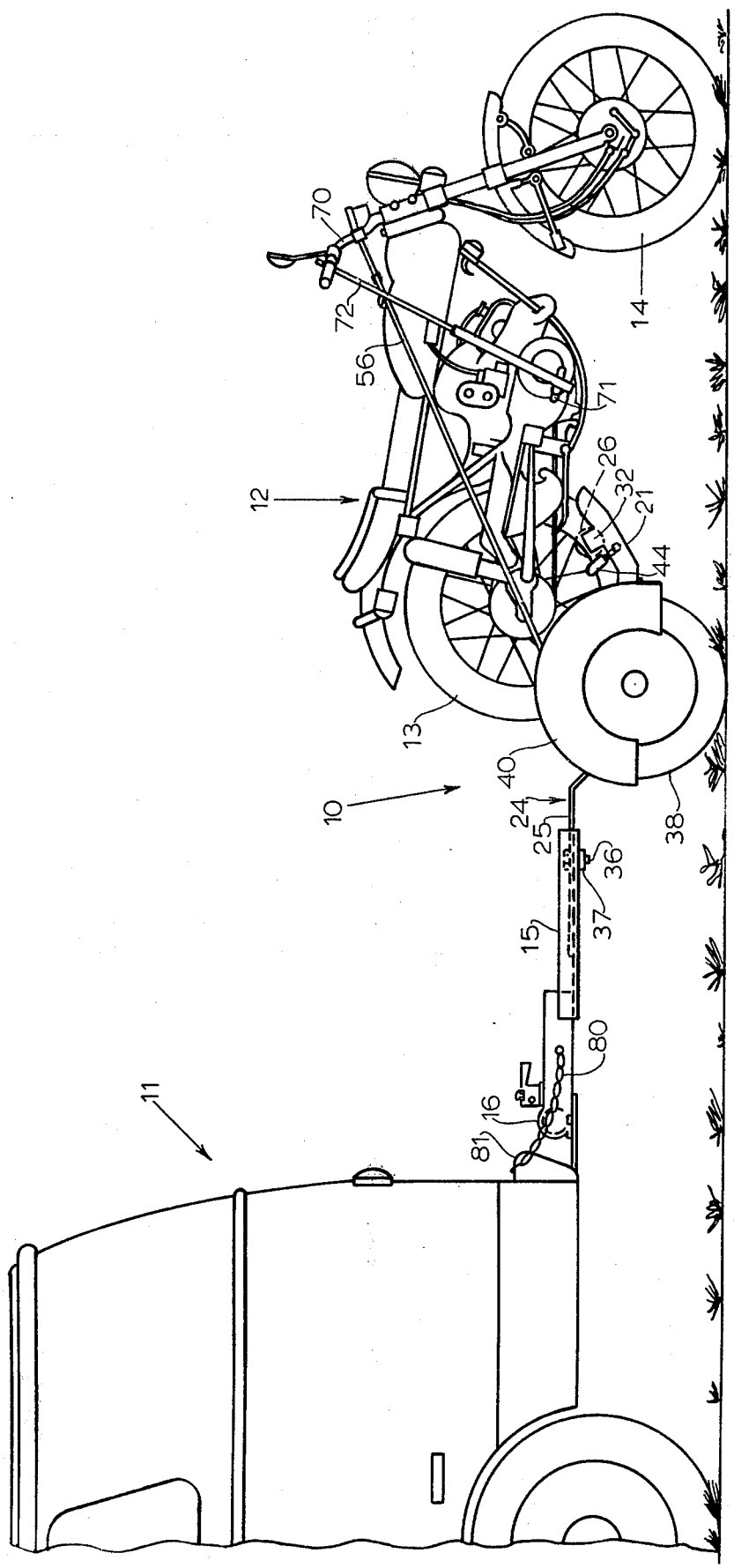
FIG. 1 is a side view of the motorcycle trailer supporting the rear wheel of a motorcycle and attached to a towing vehicle.
Figure 4:
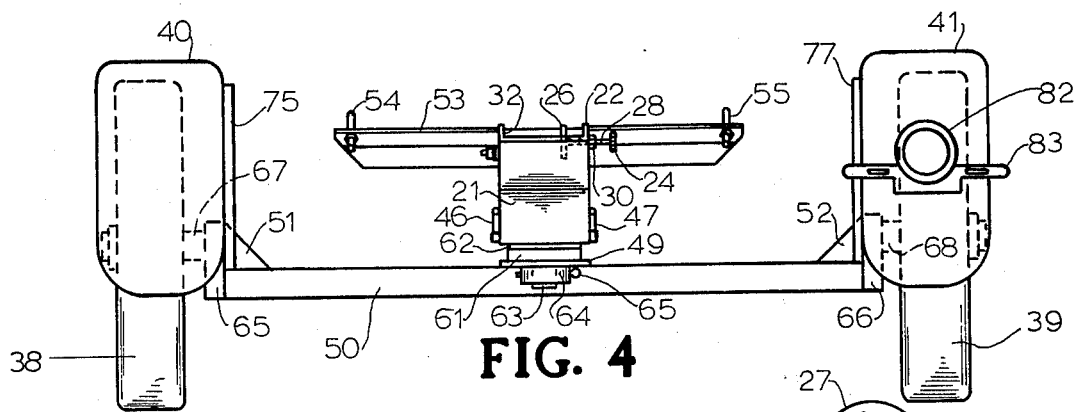
FIG. 4 is a rear view of the trailer.

Referring to FIG. 1, the two-wheel motorcycle trailer 10 of the invention is shown connected to a towing vehicle 11 by a conventional draw bar 15 and a ball and socket hitch connection 16. Trailer 10 includes a steel channel frame 50 which connects wheels 38, 39 through axle supports 65, 66 and axles 67, 68 (FIG. 4). A pair of gussets 51, 52 lend structural support to the wheel assemblies. A draw bar connector member 24 having a tongue portion 25 is welded at its lower end to frame 50. Tongue 25 is secured to draw bar 15 by bolt 36 and nut 37. Tongue 25 has a plurality of holes along its length so that the position of bolt 36 can be varied to selectively adjust the distance draw bar 15 is spaced from trailer 10. Frame 50 also serves to support fenders 40, 41 by means of fender supports 75, 76, 77, 78. Extending rearwardly from frame 50 and formed integral therewith is a cradle support plate 49 which serves to pivotally support a cradle assembly 20. Assembly 20 comprises a curved channel cradle 21 which has a curvature approximately equal to that of an average motorcycle wheel and is adapted to receive and hold either the rear or front wheel of a motorcycle during the towing operation. Member 21 is pivotally secured to support plate 49 by a swivel assembly 60. As shown in FIG. 1, in the preferred embodiment trailer 10 pivotally supports the rear wheel 13 of a motorcycle 12 and allows the front wheel 14 to follow on the road surface. The many advantages of this means of towing will be explained in detail below.

Figure 5:
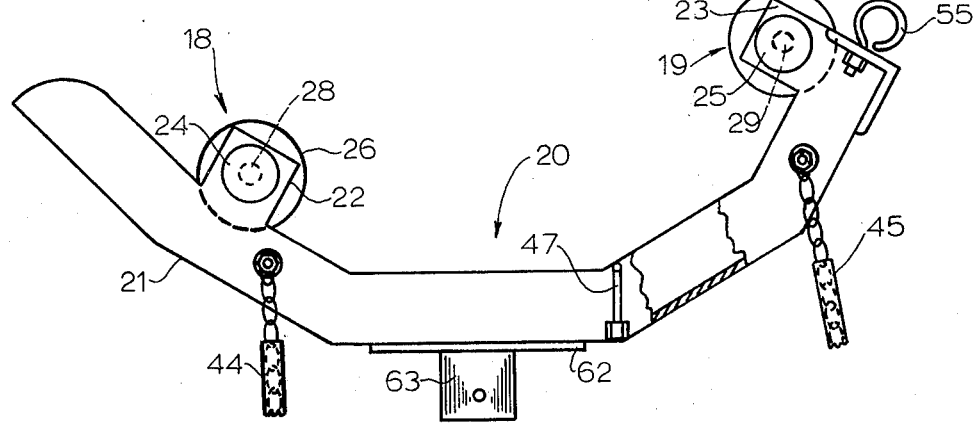
FIG. 5 is a right or passenger's side view of the cradle assembly with a portion of the cradle sidewall cut away for purposes of illustration.
Figure 6:
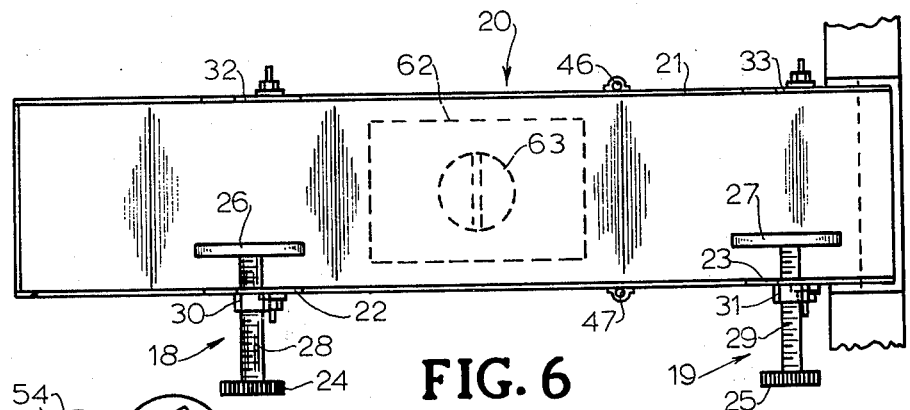
FIG. 6 is a top view of the cradle assembly shown in FIG. 5.
Figure 7:
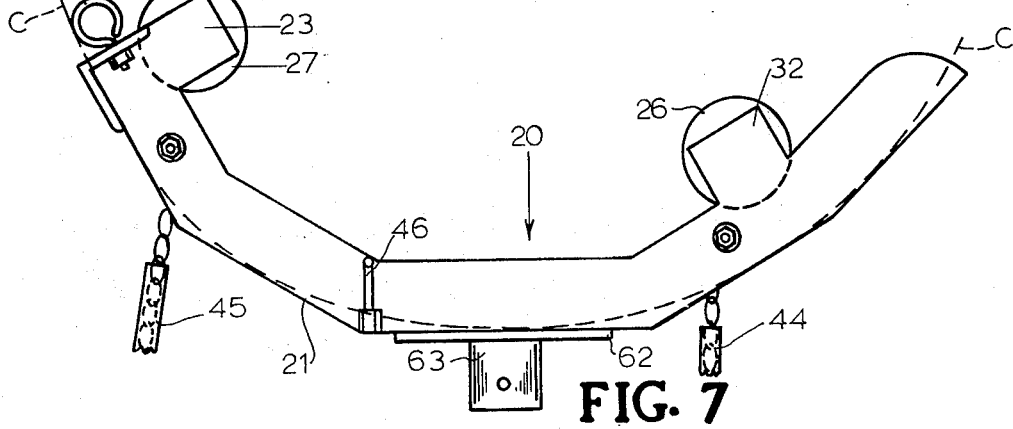
FIG. 7 is a left or driver's side view of the cradle shown in FIGS. 5 and 6 and illustrating in dashed lines the curvature, C, of the cradle.

Cradle assembly 20 will now be described with reference to FIGS. 5, 6 and 7. Cradle 21 is made from formed steel channel having approximately a 5-inch width and a 2-inch height. In specific embodiment, cradle 21 has five surfaces which interconnect to form an arc having a peripheral curvature, C, as shown in FIG. 7. Attached to the upright walls of cradle 21 are a pair of tire clamps 18, 19 which are adapted to engage the outer surface of tire 13 and hold it within cradle 21. Tire clamp 18 includes a clamp support plate 22 which has a hole for receiving clamp bolt 28. Secured to the inner end of bolt 28 is a circular clamp foot 26. Attached to the opposite upright wall of cradle 21 is a clamp bearing plate 32. In order to tighten clamp 18 against tire 13, bolt 28 is turned by means of a circular hand grip 24 until foot 26 firmly engages tire 13 and clamps tire 13 between foot 26 and bearing plate 32. A clamp nut 30 is then tightened against the outer surface of support plate 22 to hold clamp 18 in place. Clamp 19 having support plate 23, clamp bolt 29, clamp foot 27, bearing plate 33, hand grip 25 and clamp nut 31 operates in the same manner. In specific embodiment, bolts 28, 29 are ⅝ inch diameter bolts having a length of 4 inches. Clamp feet 26, 27 are metal discs having a diameter of 3 inches and a thickness of 7/16 inch. In order to supplement the securement of wheel 13 and cradle 21, a pair of chain strips 44, 45 are provided to fit between the spokes of tire 13 and hold it within cradle 21. Chains 44, 45 are attached to the exterior sidewall surfaces of cradle 21 at points between clamps 18, 19. Chains 44, 45 are, in the preferred embodiment, conventional chain strips having a pliable plastic covering to prevent scratching of the wheel rim surface.

A horizontal cross bar 53 is welded or otherwise secured to the front of cradle 21 (FIG. 4). Cross bar 53 is a steel angle piece which has at its outer ends a pair of eye loops 54, 55. Loops 54, 55 are adapted to receive the two Y-end portions of a nylon or cloth Y-strap 56 (FIG. 1) which attaches at its other end to the base of handle bar 70. Strap 56 serves as another means of securing wheel 13 into cradle 21 and lends overall stability to the towing vehicle.

It has been found that during the loading and unloading of trailer 10, it is desirable to lock cradle 21 in place so that it will not pivot. A pair of loading pins 46, 47 are provided on the exterior of each cradle sidewall to lock the cradle. During the loading or unloading operation, pins 46, 47 are slid down into a loading position where they engage the side surfaces of cradle support plate 49 in order to lock cradle 21 in place without pivoting (FIG. 2). During the towing operation, pins 46, 47 are raised to a towing position thereby freeing cradle 21 for pivoting (FIG. 3).

Referring to FIGS. 2, 3, and 4, swivel assembly 60 includes a raised surface 61 on cradle support plate 49. Surface 61 is positioned opposite a mating surface 62 on the bottom of cradle 21. Fixedly secured to cradle 21 and extending down from surface 62 is a swivel shaft 63. Shaft 63 extends through a hole in surface 61 in plate 49 and is received below plate 49 within a sleeve member 64. Sleeve 64 and shaft 63 are held together by a pin 65 which extends through mating holes in sleeve 64 and shaft 63 so that the upper surface of sleeve 64 rests against a portion of the lower surface of support plate 49. The interface between sleeve 64 and plate 49 is well lubricated and designed to bear most of the weight exerted by wheel 13 on cradle 21 thereby reducing the friction between surfaces 61 and 62.

Figure 8:
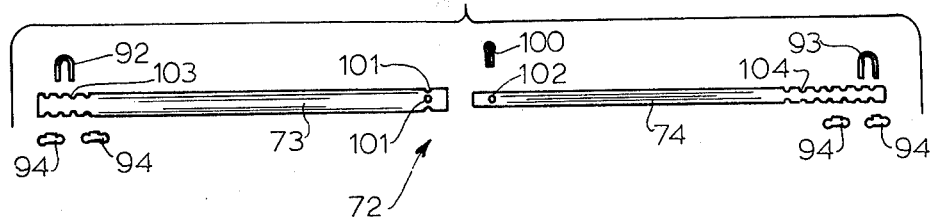
FIG. 8 is an exploded side view of the front wheel restraining bar.

As a means of holding the front wheel 14 of motorcycle 12 straight during towing, handle bar 70 is connected to front peg 71 by a front wheel restraining bar 72 as shown in FIG. 1. Bar 72 aids in preventing front wheel 14 from turning or vibrating and lends overall stability to the towing operation. Referring to FIG. 8, bar 72 includes two tubular rods, lower rod 73 and upper rod 74. Rod 74 has a smaller diameter than rod 73 and is designed to telescope within rod 73 at their junction. In order to hold rods 73, 74 together, two holes 101 are provided through rod 73 and a hole 102 is provided through rod 74 for receiving a connector pin 100. The radial angle of the interface between rods 73, 74 can be varied in 90 degree increments according to which of holes 101 are selected to align with hole 102. This adjustable feature is made necessary by the different alignment of the foot pegs and handle bars on various motorcycles. At the lower end of rod 73 are a plurality of equally-spaced holes 103. Any two adjacent holes 103 are adapted to receive a foot peg U-belt 92 which fits around foot peg 71 and is tightened in place by a pair of wing nuts 94. Similarly, rod 74 has a plurality of holes 104 for receiving handle bar U-bolt 93 which fits around handle bar 70 and is tightened in place by a pair of wing nuts 94. The distance between U-bolts 92, 93 is adjustable so as to fit motorcycles varying in size from choppers to small street bikes. It has been found that when backing up the trailer, it is desirable for the front wheel to turn slightly. Since backing up of the trailer is done only for very short distances, either immediately after loading or immediately before unloading, the operator can simply remove pin 100 before the backing-up operation to allow rods 73, 74 to turn relative to each other and thereby allow the front wheel to turn slightly. Rod 74 telescopes far enough into rod 73 so that the two will not separate during the short backing-up operation.

Referring to FIG. 1, a safety chain 80 is connected at one end to draw bar 15 and at the other end to bumper 81 of towing vehicle 11. In the event hitch connection 16 should fail, chain 80 is designed to maintain the towing relation between vehicle 11 and trailer 10 until repairs to bar 15 can be made. Also, for safety purposes, tail light 82 is secured to the rear of fender 41. A license tag support 83 is attached to tail light 82 (FIG. 4).

The description will continue with the operation of trailer 10. In order to load motorcycle rear wheel 13 onto trailer 10, the operator first engages the standard center stand of motorcycle 12 to elevate the rear wheel 13 a few inches off the ground to the position shown in FIG. 2. Next, loading pins 46, 47 are lowered to their loading position to prevent pivoting of cradle 21 during the loading operation. In order to "scoop" wheel 13 into cradle 21, draw bar 15 is lifted to lower cradle 21 to the position shown in FIG. 2, and trailer 10 is rolled toward motorcycle 12 so as to slide cradle 21 under rear wheel 13. The operator then lowers draw bar 15 a few inches to raise cradle 21 into close engagement with wheel 13. It should be noted that draw bar 15 is selected to have sufficient weight and length so that when cradle 21 is brought into such close engagement with wheel 13, the operator can release draw bar 15 and cradle 21 will continue to engage wheel 13; that is, the moment arm X created by draw bar 15 about axles 67, 68 is greater than the moment arm Y created by cradle assembly 20 (see FIG. 2). Therefore, after releasing draw bar 15, the operator can move to cradle assembly 20 and secure chains 44, 45 and clamps 18, 19 to wheel 13. The upward force exerted by cradle 21 on wheel 13 during these steps is not great enough to tilt motorcycle 12 off of its center stand. After securing cradle 20 to wheel 13, the operator next lowers motorcycle 12 off of the center stand. Using draw bar 15 as a lever arm, he then presses down on bar 15 to bring it to a horizontal position and thereby raise cradle 21 to the position shown in FIG. 3. He then pulls the trailer and motorcycle to the towing vehicle for hitching. Safety chain 80, Y-strap 56 and front wheel restraining bar 72 are secured in place as previously described to complete the loading operation. Finally, loading pins 46, 47 are withdrawn to the towing position to make cradle 21 horizontally pivotal for the towing operation. Unloading is accomplished by essentially reversing the steps of the loading operation. When two people are available for loading, the first person lowers the cradle 21 so that the second person can roll one of the motorcycle wheels into the cradle. By using draw bar 15 as a lever arm, the first person can press down on bar 15 to bring it to a horizontal position; and, while the trailer is held in this position, the second person can secure cradle 21 to wheel 13 by means of chains 44, 45 and clamps 18, 19. The trailer is then rolled to the towing vehicle and hitched thereto.

In specific embodiment, draw bar 15 is approximately 26 inches long and attached to connector member tongue 25 at a distance ranging from 12 to 27 inches from axles 67, 68. Thus, the end of draw bar 15 can be extended as far as 53 inches from axles 67, 68 in order to provide a long lever arm for raising and lowering the trailer during loading and unloading of heavy motorcycles. The weight of draw bar 15 is such that regardless of where bar 15 is selectively located along the length of tongue 25, the moment along moment arm X (FIG. 2) is greater than the moment along moment arm Y to facilitate loading and unloading. It should also be noted that the "scooping" effect created by cradle 21 during the loading operation is made more effective by the location of swivel assembly 60 approximately one foot behind frame 50 instead of directly above it. Although in the preferred embodiment cradle 21 is normally secured to the rear wheel of the motorcycle, the operator may choose to secure cradle 21 to the front wheel and disconnect the motorcycle chain so the rear wheel can follow on the road surface.

Figure 9:
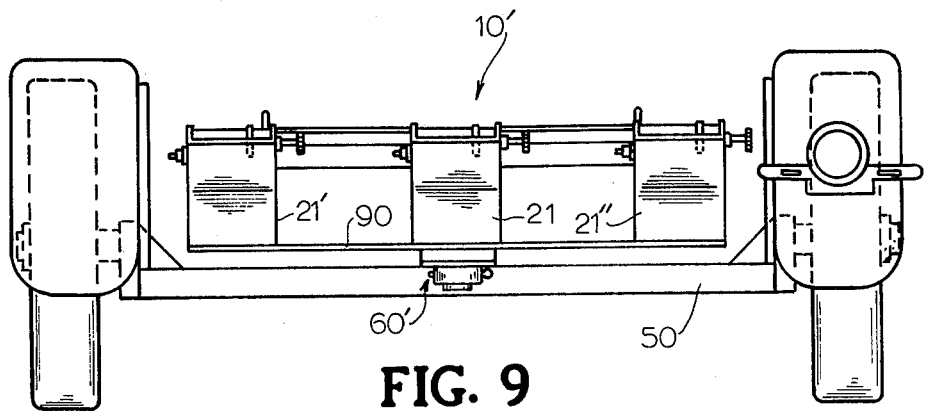
FIG. 9 is a rear view of a trailer adapted to hold up to three motorcycles.
Figure 10:
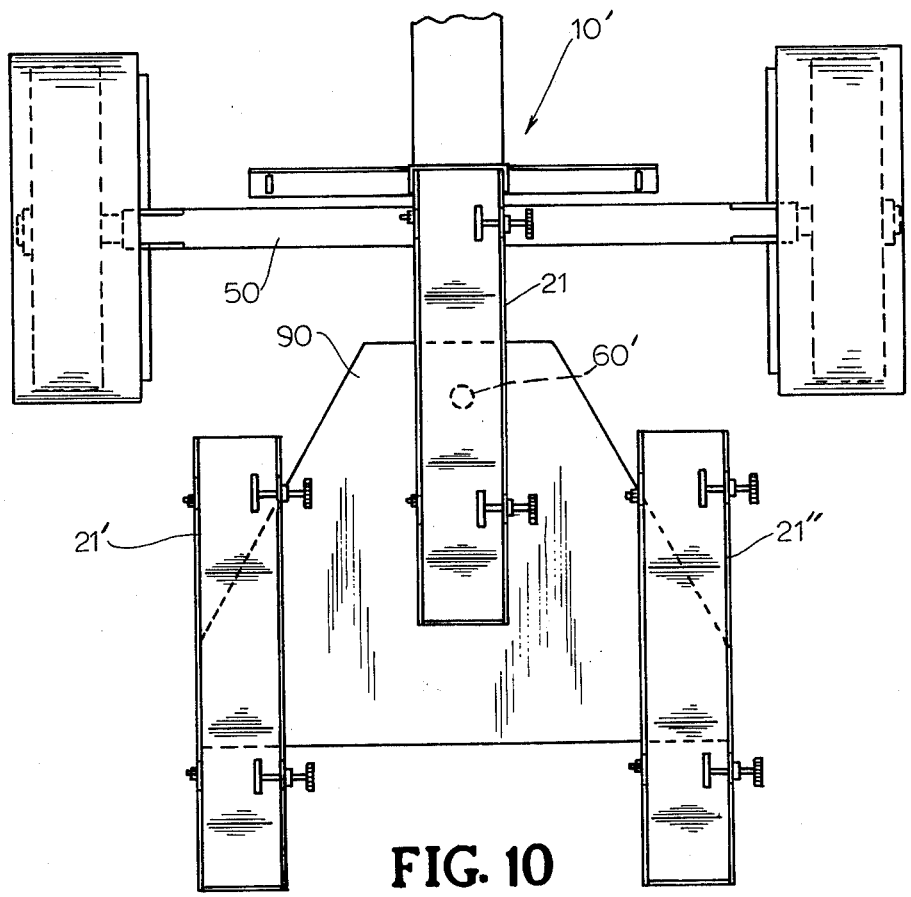
FIG. 10 is a plan view of the trailer shown in FIG. 9.

In an alternative embodiment shown in FIGS. 9 and 10, trailer 10' includes three cradles 21, 21', 21''. Cradle 21 is adapted to pivot about swivel assembly 60' and cradles 21', 21'' are fixedly secured to cradle 21 by support plate 90 so that all three cradles pivot together about assembly 60'. In order to prevent cradles 21', 21'' from contacting the trailer fenders during turning, swivel assembly 60' is located approximately 1 foot behind frame 50. Trailer 10' can hold up to three motorcycles. For towing a single motorcycle, cradle 21 is used. For towing two motorcycles, cradles 21' and 21'' are used. And for towing three motorcycles all of cradles 21, 21', 21'' are used.

In summary, the apparatus of the present invention provides a simple and reliable motorcycle trailer which can be operated in loading and unloading by one person. Since the trailer of the invention is towed instead of being suspended from the towing vehicle, the towing operation results in minimal road handling problems for the towing vehicle, and the system of the invention can be readily adapted, in an alternative embodiment, to tow up to three motorcycles. Because the front wheel remains on the road surface during towing, the springs of the motorcycle are utilized to absorb road shock so that no springs need to be included as a part of the trailer. The elevation of the rear wheel eliminates wear on the rear wheel caused by axial forces during turning. Most of the weight of the motorcycle is directed into the cradle and is borne on the road surface by the trailer wheels thereby minimizing the wear on the front tire during towing. Furthermore, the trailer can be disassembled into a frame and wheels section, a cradle section and a draw bar section for transportation or storage in the trunk of a standard size car.

What is claimed is:

1. A trailer for towing behind a towing vehicle a motorcycle having front and rear wheel means, a handle bar, and a foot peg, comprising in combination:
    a. a frame;
    b. a pair of trailer wheels attached to said frame for supporting said frame above the road surface;
    c. a curved channel cradle secured to said frame for horizontal pivotal movement, said cradle comprising an arc-like portion having channel sidewalls and a peripheral curvature approximating the curvature of said motorcycle wheels and having a width between said sidewalls sufficient to receive a selected motorcycle wheel;
    d. means on said cradle for securing said selected motorcycle wheel within said cradle;
    e. a draw bar attached at one end to said frame and adapted to be removably attached at the other end to said towing vehicle; and
    f. rigid connecting means releasably secured at one end to said handle bar and at the other end to said foot peg, said connecting means holding said handle bar in a fixed position during towing.

2. A trailer as claimed in claim 1 wherein said means on said cradle comprises a tire clamp having a bolt member with a disc portion on one end thereof for engaging an outer surface of the tire of said rear wheel, said bolt being mounted adjacent one sidewall of said cradle with said disc facing inwardly, whereby upon tightening of said bolt said disc is adapted to engage an outer side surface of said tire thereby urging the other side surface of said tire against the opposing sidewall of said cradle.

3. A trailer as claimed in claim 2 including supplementary fastening means for securing said motorcycle rear wheel to said cradle, said supplementary fastening means comprising a bendable strip portion fastened at the ends thereof to the opposing sidewalls of said cradle and extending through the spokes of said wheel whereby upon tightening of said strip portion said strip will contact the rim of said wheel thereby drawing said wheel into said cradle.

4. A trailer as claimed in claim 1 wherein said rigid connecting means comprises a pair of rods coaxially aligned and interconnected end to end and having means at such interconnection for adjustng the radial angle of the interface between said pair of rods.

5. A trailer as claimed in claim 1 wherein said draw bar is selected to have such weight and length that said trailer, when unloaded, will normally rest at one end on said trailer wheels and at the other end on the forward end of said draw bar.

6. A trailer as claimed in claim 1 wherein said draw bar is adjustable in length thereby providing an adjustable lever arm for loading and unloading of said trailer.

7. A trailer as claimed in claim 1 wherein said cradle and draw bar are detachable from said frame thereby providing a three-piece disassembled trailer.

8. A trailer as claimed in claim 1 including means for securing said cradle in a fixed position without horizontal pivotal movement during the loading and unloading of said trailer.

9. A trailer as claimed in claim 1 wherein said cradle is secured to said frame at a point approximately 1 foot behind the line connecting the center of said trailer wheels.

10. A trailer as claimed in claim 1 wherein said draw bar, when connected to said frame, extends at least 36 inches in front of the line connecting the center of said trailer wheels.

* * * * *